(No Model.)
J. P. QUINETTE.
HAME.
No. 283,815. Patented Aug. 28, 1883.
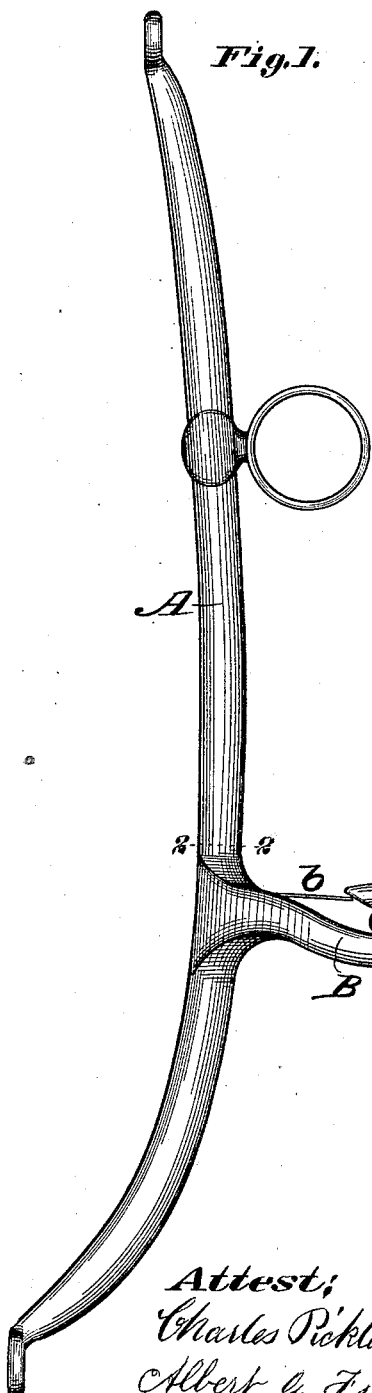
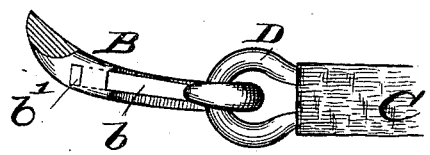
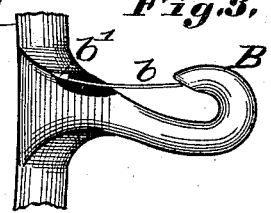
Attest:
Charles Pickles
Albert G. Fish
Inventor:
Jermain P. Quinette
by C D Moody
atty

UNITED STATES PATENT OFFICE.

JERMAIN P. QUINETTE, OF ST. LOUIS, MISSOURI.

HAME.

SPECIFICATION forming part of Letters Patent No. 283,815, dated August 28, 1883.

Application filed January 6, 1883. (No model.)

*To all whom it may concern:*

Be it known that I, JERMAIN P. QUINETTE, of St. Louis, Missouri, have made a new and useful Improvement in Hames, of which the following is a full, clear, and exact description, reference being had to the annexed drawings, making part of this specification, in which—

Figure 1 is a side elevation of a hame having the improvement, the tug being attached; Fig. 2, a section on line 2 2 of Fig. 1; and Fig. 3, a view, partly in section, of that portion of the hame with which the improvement in question is immediately connected.

The same letters denote the same parts.

My invention relates to metal hames; and it consists in a hame-bar and a hook formed entire, said hook being provided with a spring-tongue, and all forming a combined hame-bar and snap-hook, as will be hereinafter explained.

A designates the hame-bar, which is constructed with eyes on its end, and also with a trace-hook, in the usual well-known manner.

B designates a snap-hook, which is formed on the hame-bar in an appropriate place, uniting with it by a broad shank, into which a slot, $b'$, is made. The hook B, it will be seen, is an integral part of the hame-bar; or, in other words, the hook and bar are formed entire. The hook B is curved laterally, as shown by Fig. 2, and into its slot $b'$, I insert one end of a spring-tongue, $b$, the other end of which bears against the under beveled end of the hook B, as clearly shown in Figs. 1 and 3.

C designates part of a trace, and D is the clip thereof, which is represented in Figs. 1 and 2 attached to the snap-hook and confined therein by the spring-tongue $b$.

Having described my invention, what I claim as new, and desire to secure by Letters Patent, is—

The improved article of manufacture consisting of a metal hame and trace-hook, formed of one piece, and provided with the spring-tongue resting in the slotted shank of the trace-hook, substantially as described.

J. P. QUINETTE.

Witnesses:
C. D. MOODY,
SAML. S. BOYD.